UNITED STATES PATENT OFFICE.

HARRY S. MORK, OF BROOKLINE, AND CHARLES F. COFFIN, JR., OF WATERTOWN, MASSACHUSETTS, ASSIGNORS TO THE LUSTRON COMPANY, OF SOUTH BOSTON, MASSACHUSETTS, A VOLUNTARY ASSOCIATION OF MASSACHUSETTS.

METHOD OF PREPARING CELLULOSE-ESTER PRODUCTS.

1,421,288. Specification of Letters Patent. Patented June 27, 1922.

No Drawing. Application filed March 12, 1921. Serial No. 451,846.

*To all whom it may concern:*

Be it known that we, (1) HARRY S. MORK and (2) CHARLES F. COFFIN, Jr., citizens of the United States, residing at (1) Brookline, (2) Watertown, in the counties of (1) Norfolk, (2) Middlesex, and State of Massachusetts, have invented certain new and useful Improvements in Methods of Preparing Cellulose-Ester Products, of which the following is a specification.

This invention relates to methods for the preparation of cellulose ester products of predetermined and standardized dyeing speed. By cellulose esters we mean particularly such substances as cellulose acetate, butyrate and propionate.

The standardization of the dyeing speed in the sense in which the expression is used herein does not consist in adding retardants or assistants to the dye bath, or in governing the time and temperature during dyeing; but the dyeing speed (or in other words the dye absorption rate) as the term is used herein is an inherent property of the undyed cellulose ester or of the product derived therefrom when the same is prepared in accordance with this invention.

The standardization of the dyeing speed can be secured to a greater or less degree in three different ways, or by certain combinations thereof, viz:

(*a*) By exercising a practical method of control of the conditions of the chemical reaction by which the cellulose ester is produced.

(*b*) By suitably treating each batch of cellulose ester or cellulose ester product after it has been produced in order to bring it to a predetermined dyeing speed.

(*c*) By combining lots of non-identical dyeing speeds in relative proportions to produce a product having a desired dyeing speed.

For the purpose of detailed description of our invention in so far as it relates to the primary reaction, we will illustrate it by showing its application to the manufacture of cellulose acetate and products resulting from the subsequent manipulation of cellulose acetate. Also for the purpose of illustration we will describe it with reference to the manufacture of cellulose acetate according to United States Patent No. 854,374, May 21, 1907, to H. S. Mork.

The above patent covers the process of making what is now termed "fibrous" cellulose acetate or a type of cellulose acetate in which the original form of the cellulose used is substantially conserved. In the commercial conduct of this process it has heretofore been the custom to govern the conditions of the process, viz proportion of condensing agents, time, temperature, proportions of restraining agent, etc., solely from the point of view of obtaining final acetylation products of desired solubility, viscosity, mechanical strength, elasticity and durability. We believe in fact that heretofore all fundamental cellulose reactions have been carried out with these objects in view.

Now for certain purposes, as for example the manufacture of artificial silk, it is not only important to control in the primary cellulose acetate all the properties above mentioned, but it is also desirable to control the conditions of the reaction so that different batches of the ester shall in so far as is practically possible exhibit a definite behavior when subjected to a subsequent process of being dyed by dyes or dyestuffs for which the cellulose compound may have a specific affinity.

Cellulose acetate and cellulose acetate products made therefrom, as for example, cellulose acetate artificial silk, have peculiar dye affinities and dye resist properties, in that unmordanted cellulose acetate has a very strong affinity for the basic dyes, for example methylene blue and auramine, and at the same time practically no affinity for the direct cotton or benzidine dyes. Unlike the animal fibres, it has practically no affinity for the acid dyes.

In the ordinary conduct of the Mork process mentioned above, wherein successive batches of cellulose acetate produced thereby all show this characteristic affinity for basic dyes and lack of affinity for the direct cotton dyes, successive batches are apt to exhibit decided differences in the rate at which they will take on or be dyed by basic dyes, as will hereinafter be explained. We have discovered means whereby this difference in dyeing rate may be corrected, either in the acetylation process, or in the subsequent manipulation of the cellulose acetate or cellulose acetate product thereby produced, as preferably by a combination of these methods.

Unmordanted cotton has practically no affinity for the basic dyes, but when subjected to an acetylation process, particularly the Mork process, coincident with incipient acetylation the cotton acquires the capacity of absorbing basic dyes very rapidly from aqueous solutions thereof. In the early stages of the acetylation, even though the cotton has acquired the capacity of being dyed by the basic dyes without mordant, it does not lose wholly its affinity for the direct cotton colors. As the acetylation proceeds the capacity for absorbing the basic colors still persists, but the capacity for absorbing direct cotton colors gradually diminishes. We have discovered that as the acetylation proceeds from its early stages, whereas the acetylated cotton still maintains its capacity of being dyed to full shades by basic colors, there is a peculiar lessening as the process proceeds towards complete acetylation of the rate at which the cellulose acetate will be dyed by the basic colors.

If the acetylation process is conducted solely from the point of view of producing different batches of cellulose acetate of uniform or specific solubility and viscosity, these characteristics can readily be produced; but unless other precautions are taken these different batches may absorb basic dyes at widely differing rates. This property of differential dyeing rate will follow through to any products made from these different batches of cellulose acetate; so that if it is desired to manufacture artificial silk therefrom, one lot may dye at one rate and another lot may dye at another rate. When these different lots of artificial silk are mixed, as they always will be in commercial textile operations, even if great precautions are taken dyed yarns or fabrics will be produced which will show streaks and irregularities, which in most cases are highly undesirable and render the material unsalable. The advantage, therefore, of being able to produce cellulose acetate products of uniform dyeing rate is very obvious.

Whereas in ordinary acetylation procedures it is the practice to control the solubility and the viscosity of the cellulose acetate by regulating the amount and character of the condensing agent, the temperature and the reaction time; in order to lessen the dyeing speed differences between successive batches of cellulose acetate particular attention must be given to the quantity of acetic anhydrid used and to the time of reaction. It is the uniform custom to use an amount of acetic anhydrid in excess of that theoretically required to produce cellulose acetate of practically complete solubility. The amount of this excess appears to govern more than any one other factor, the rate at which the cellulose acetate will dye.

To make this somewhat clearer, assume that two cellulose acetates are produced which show complete solubility in the same proportionate mixture of tetrachlorethane and alcohol as a solvent and give solutions at equal concentrations of like viscosities; but in one case the amount of anhydrid used in the acetylation was only slightly in excess of the theoretical quantity necessary, while in the other case it was very considerably in excess of the theoretical amount of acetic anhydrid necessary. The cellulose acetate produced in the first instance will be a very much more rapid dyer than that produced in the second instance. For example, in the first instance the cellulose acetate might exhaust a dye bath made up with $\frac{1}{2}\%$ by weight of methylene blue in two or three minutes at normal temperature, whereas in the second instance eight or ten minutes might be required. Inasmuch as each of these lots if dyed separately and given sufficient length of dyeing will completely exhaust the dye bath, the color of both of them after dyeing would be the same. On the other hand if a mixture of these two lots of cellulose acetate are dyed together in the same dye bath, it will be found that when the dye is exhausted the fast dyer will be dyed a very deep shade and the slow dyer will be dyed a very pale shade.

If these particular lots cited above are individually dissolved in suitable solvents and manufactured into different lots of artificial silk, the silk produced from the fast dyeing lot of cellulose acetate will dye more rapidly than the silk produced from the slow dyeing lot of cellulose acetate.

As indicated above, within the limits of good solubility fast dyers and slow dyers can be produced. Convenience of operation would dictate that a standard be adopted at some point within the solubility range which was neither at the fast dyeing limit or the slow dyeing limit.

We have also stated our discovery of the fact that within the solubility range, the more complete the acetylation the slower is the dyeing rate. But we have further found that the dyeing rate of slow dyeing cellulose esters and cellulose ester products can be accelerated by a suitable de-esterifying treatment, such for example as treatment with aqueous solutions of either alkalies or mineral acids, either hot or cold. The acceleration of the dye rate progresses gradually, and we have found by experiment that it is possible to arrest the treatment at a predetermined dye rate standard with commercial accuracy.

If the fibrous cellulose acetate is to be used in its original acetylated fibrous form for textile constructive purposes, it is necessary that all the batches should be acetylated uniformly to a predetermined dye rate standard, which is an exceedingly difficult commercial operation; or preferably all the batches can be acetylated until they have a dye rate equal to or slower than the predetermined standard, and then those batches having a slower dye rate can be treated as hereinbefore indicated to bring them to the desired dye rate or to any desired approximation thereto.

If different batches of cellulose acetate which have not been standardized as to the dye rate are converted by means of solvents into products such as films, artificial silk and so forth these latter can also be treated as described until they acquire the desired dye rate.

We have discovered, however, another method of standardizing the dye rate of "colloided" or conversion products of the original cellulose acetate, such as filaments, etc.

Inasmuch as the manufacture of films and filaments involves working the cellulose acetate into a practically homogeneous mass by treatment with a solvent or plasticizer or both, it is possible during such treatments to mix or blend cellulose acetates of different dye rates. We have found that it is possible to measure the comparative dye rates of different lots of cellulose acetate, and then to blend these different lots according to the dye rate measure to produce a conversion product, as for example, a plastic mass, film or filament of any desired dye rate standard. We have found that a blend of two or more different lots of cellulose acetate of not widely varying dye rates will have a dye rate very close to the numerical average of the dye rates of the individual lots; but that when the different lots in the blend have widely different dye rates, then the dye rate of the blend departs somewhat from the mathematical average of the individual lots. In this latter case, proportions necessary to blend to procure a standard dye rate must be determined by test, although it is probable that when more data is available a mathematical expression may be worked out which will enable the dye rate standard to be calculated from the rates of the individual lots even when the lots vary widely in dye rate.

It is evident that in discovering the differential dyeing rates of different lots of cellulose acetate and means of standardizing the dye rate, that we have made a discovery not only of fact but of broad principle and of vital importance to industries based on the manufacture and use of cellulose compounds, such as the manufacture of cellulose acetate silk. This principle of dye control is not only applicable to cellulose acetate and cellulose acetate products but also to the production of, and use of any allied cellulose compounds where like variabilities exist.

It will be further evident from the foregoing that various combinations of the several standardizing methods may be employed without departing from our invention. For example, batches differing rather widely in dyeing speed may be brought to any desired approximation of uniformity by partial de-acetylization of the material of slower dyeing speed; and the several batches may thereafter be combined, as described, in the relative proportions to yield a homogeneous product having the desired predetermined dyeing speed. Also, as stated above, the de-esterification or after-treatment of slow dyeing batches may be applied if desired to the final product, for example artificial silk.

We do not claim herein specifically the method described according to which the batches of cellulose ester of slower dyeing speed are subjected to after-treatment to effect substantial or partial equalization of the dyeing speeds of the several batches and the batches then combined in the presence of a solvent. Such method is the subject of a divisional application filed by us on November sixteenth, 1921, Serial No. 515,630.

Nor do we claim herein the method just described as applied to the preparation of artificial silks of standardized dyeing speed. This embodiment of the invention is the subject of another divisional application filed by us on November sixteenth, 1921, Serial No. 515,631.

We claim:

1. Method of preparing cellulose ester products of standardized dyeing speed, comprising preparing several batches of the ester; and then combining the batches in presence of a solvent and in relative proportions to produce a homogeneous product having the desired predetermined dyeing speed.

2. Method of preparing cellulose ester products of standardized dyeing speed, comprising preparing separate batches of the ester; determining the numerical values representing the respective dyeing speeds of said batches; and then combining the batches in presence of a solvent and in relative proportions to produce a homogeneous product having the desired predetermined dyeing speed.

In testimony whereof, we affix our signatures.

.HARRY S. MORK.
CHARLES F. COFFIN, Jr.